United States Patent [19]

Hayakawa et al.

[11] Patent Number: 5,070,348
[45] Date of Patent: Dec. 3, 1991

[54] WATERPROOF AND/OR WATER-RESISTANT CAMERA

[75] Inventors: Masahiro Hayakawa; Kosei Kosako, both of Tokyo, Japan

[73] Assignee: Asahi Kogaku Kogyo Kabushiki Kaisha, Tokyo, Japan

[21] Appl. No.: 580,604

[22] Filed: Sep. 11, 1990

[30] Foreign Application Priority Data

| Sep. 13, 1989 | [JP] | Japan | 1-107343[U] |
| Dec. 22, 1989 | [JP] | Japan | 1-148266[U] |
| Dec. 26, 1989 | [JP] | Japan | 1-149648[U] |
| Dec. 26, 1989 | [JP] | Japan | 1-149649[U] |
| Jan. 18, 1990 | [JP] | Japan | 2-3458[U] |
| Feb. 27, 1990 | [JP] | Japan | 2-19329[U] |

[51] Int. Cl.⁵ ............................................. G03B 17/08
[52] U.S. Cl. ..................................................... 354/64
[58] Field of Search ........................................ 354/64

[56] References Cited

U.S. PATENT DOCUMENTS

| 4,312,580 | 1/1982 | Schwomma et al. | 354/64 |
| 4,763,145 | 8/1988 | Takamura et al. | 354/64 |
| 4,771,299 | 9/1988 | Gell | 354/64 |
| 4,771,320 | 9/1988 | Gell | 354/64 |
| 4,931,816 | 6/1990 | Kano et al. | 354/64 |
| 4,963,902 | 10/1990 | Fukahori | 354/64 |

FOREIGN PATENT DOCUMENTS 63-113137 7/1988 Japan.

OTHER PUBLICATIONS

United Kingdom Search Report Application No. 90 19906.8, searched Dec. 11, 1990.

Primary Examiner—Michael L. Gellner
Attorney, Agent, or Firm—Sandler, Greenblum & Bernstein

[57] ABSTRACT

A waterproof and/or water-resistant camera including a movable photographing lens barrel which moves in the optical axis direction of the camera, an air breathing passage for connecting the interior and the exterior of the camera, an air-permeable and water-impermeable filter provided in the air breathing passage, and a protection cover which covers the air-permeable and water-impermeable filter to constitute an air connecting assembly for the air-permeable and water-impermeable filter.

45 Claims, 14 Drawing Sheets

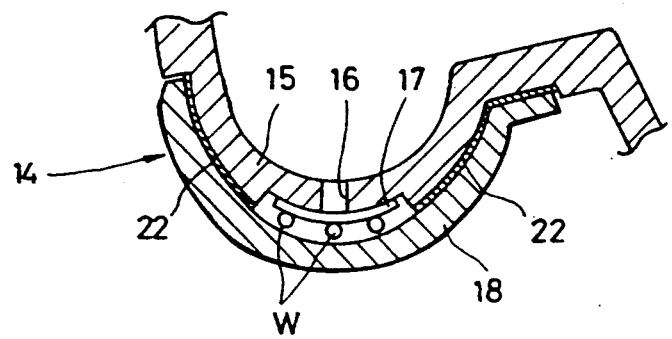
Fig. 2
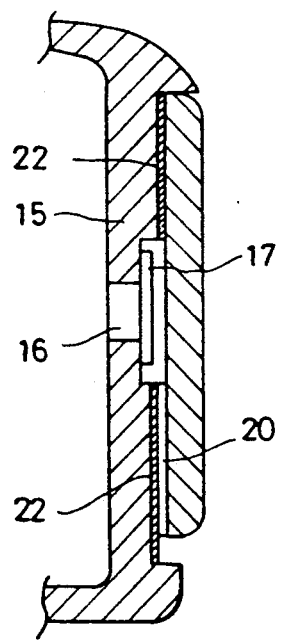 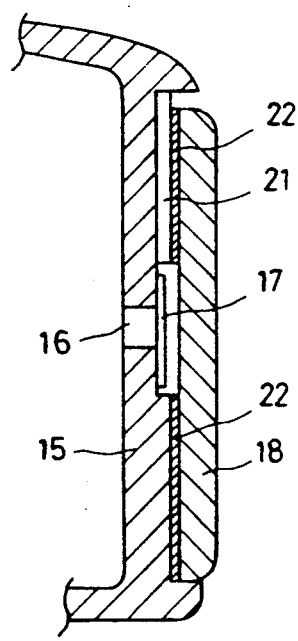
Fig. 3　　　　　Fig. 4

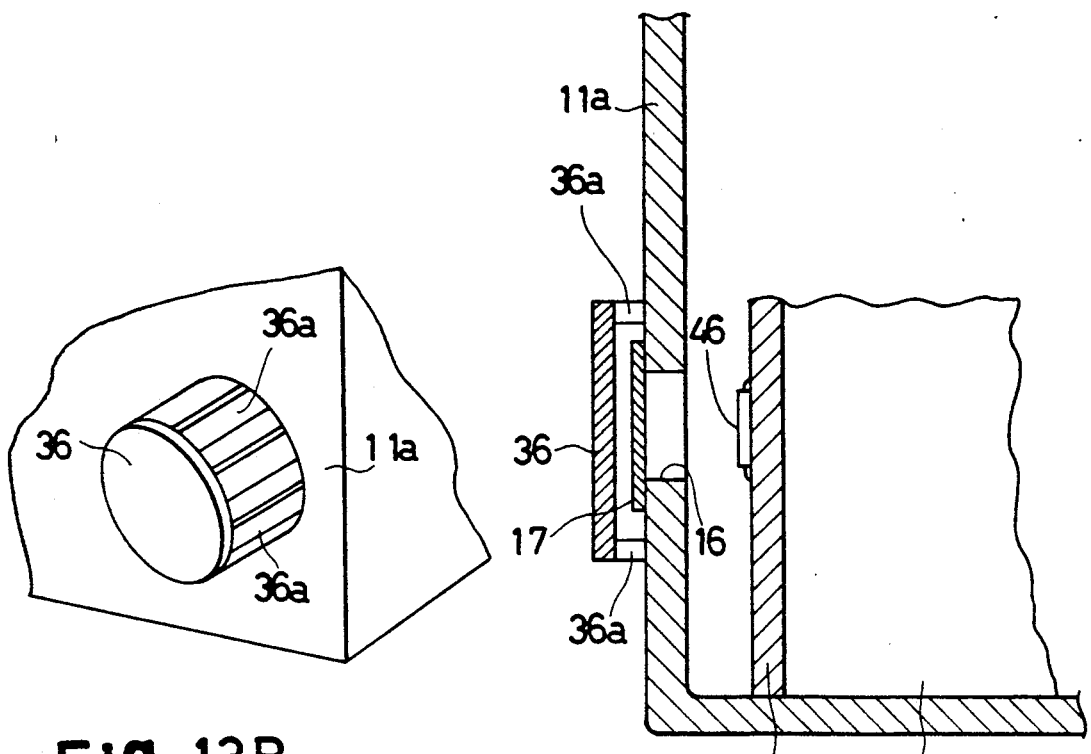
Fig.13B
Fig.15
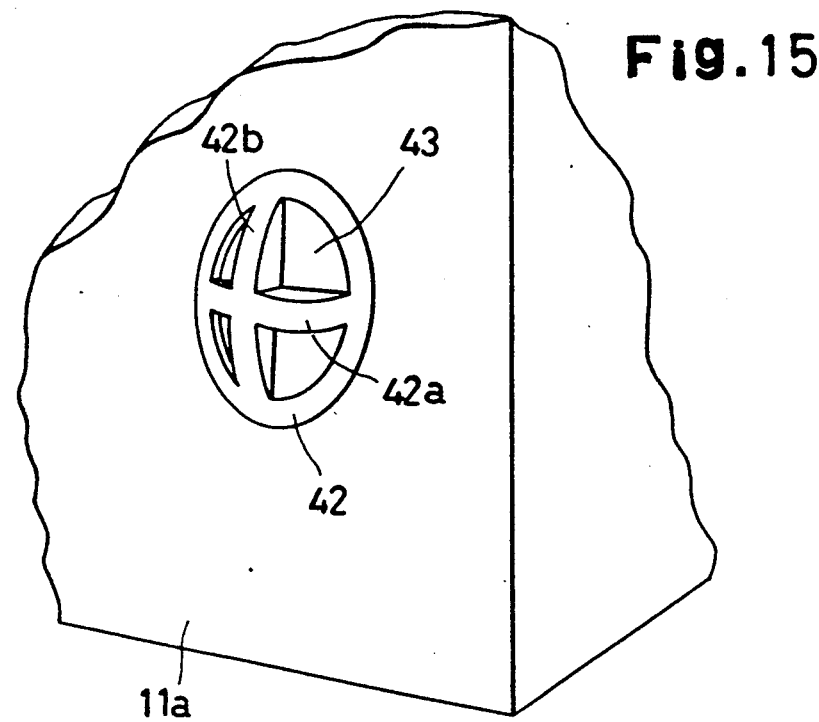
Fig.14

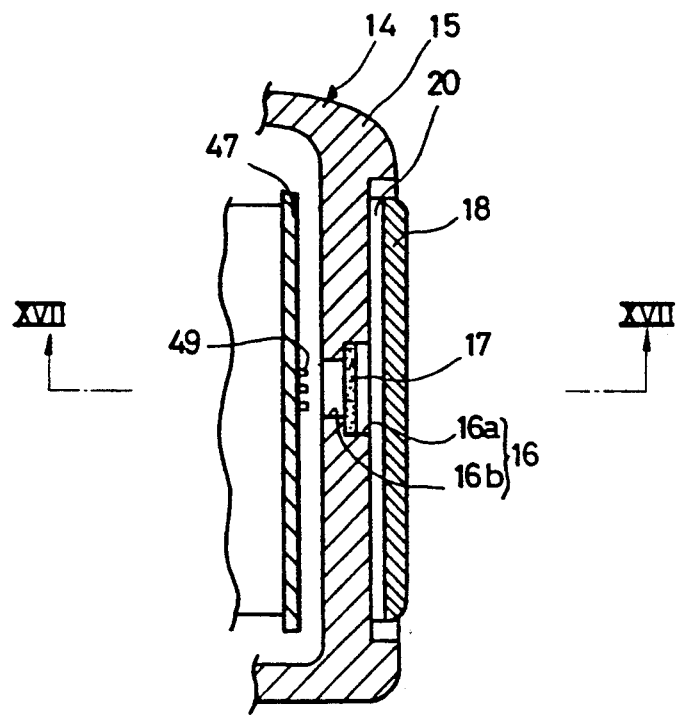
F I9.16C
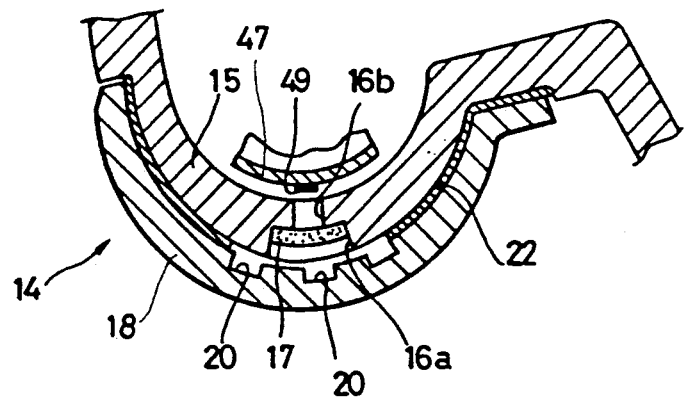
F I9.17

WATERPROOF AND/OR WATER-RESISTANT CAMERA

BACKGROUND OF THE INVENTION

1. Field of the Invention

The present invention relates to a waterproof and/or water-resistant camera, and more precisely, it relates to a waterproof and/or water-resistant camera having a photographing lens barrel which is movable relative to a camera body.

2. Description of the Related Art

Recently, water-resistant cameras which do not permit rain, spoon-drift (spray) or the water from a stream to permeate therethrough, or waterproof cameras which can take a picture even in shallow water have been available on the market. There have been attempts to realize a waterproof and/or water-resistant zoom lens camera. In the attempts, one of the most significant problems to be solved is a water-tight connection between the movable photographing lens barrel and the immovable camera body. To this end, it is known to provide an O-ring (annular seal member) in a space defined between the photographing lens barrel which is mounted to the camera body so as to retractably and relatively move through an opening formed in the front wall of the camera body and the inner peripheral edge of the front wall of the camera body which defines the opening. It is necessary to provide an air breathing passage which connects the inside and the outside of the camera body in order to absorb a change in volume of the space in which the photographing lens barrel moves, thereby to absorb a change in operational force of the photographing lens barrel, thus resulting in smooth zooming and focusing operations.

To satisfy both the requirements of the air breathing and watertightening watertightness, it is necessary to provide an air-permeable and water-impermeable filter in the air breathing passage.

To reduce the passage resistance of the air breathing passage, preferably, the air-permeable and water-impermeable filter is provided to be exposed on the outer surface of the camera body, however this increases the possibility that the air-permeable and water-impermeable filter may be damaged, soiled or clogged, thus resulting in a deterioration of the filter.

Also, the exposure of the filter has an adverse effect on the appearance of the camera.

To solve the problems mentioned above, it is possible to provide a protection cover which covers the air-permeable and water-impermeable filter, however this increases the possibility that water may remain in a space defined between the air-permeable and water-impermeable filter and the protection cover, thus resulting in a decrease of the air-permeability of the air-permeable and water-impermeable filter.

FIG. 20 shows an example of an annular seal member 23 provided in the space defined between the photographing lens barrel 12 and the opening 19a formed in a stationary lens barrel 19 of the camera body. In FIG. 20, the annular seal member 23 is compressed or contracted by the inner wall (fastening portion) 24 of the stationary lens barrel 19 to bring the seal member 23 into press contact with the outer periphery of the photographing lens barrel 12 in a watertight fashion. In FIG. 20, numeral 53 designates a cam ring, 54 a cam groove, and 48 a stationary ring, respectively.

In the arrangement shown in FIG. 20, when the center axis O of the annular fastening portion 24 is identical to the center axis O' of the photographing lens barrel 12 which is inserted in the opening 19a, as shown in FIG. 21, no problem is raised. However, if the center axis O' of the photographing lens barrel 12 is deviated from the center axis O of the annular fastening portion 24, the inner periphery A of the annular seal member 23 is irregularly deformed with respect to the outer periphery B thereof, as shown in FIG. 22. The irregular deformation leads to a failure to watertight connection or an increase of a frictional resistance against the slide movement of the photographing lens barrel 12.

SUMMARY OF THE INVENTION

The primary object of the present invention is to prevent an air permeable and water impermeable filter provided in an air breathing passage of a waterproof and/or water-resistant camera from being damaged, soiled and clogged, without inviting any substantial change in appearance of the camera.

Another object of the present invention is to provide a waterproof and/or water-resistant camera in which the watertight connection of the photographing lens barrel to the camera body can be easily established by a simple construction without increasing the frictional slide resistance of the photographing lens barrel.

To achieve the objects mentioned above, according to the present invention, there is provided a waterproof and/or water-resistant camera comprising a movable photographing lens barrel which moves in the optical axis direction of the camera, an air breathing passage which connects the interior and the exterior of the camera, an air-permeable and water-impermeable filter provided in the air breathing passage, and a protection cover which covers the air-permeable and water-impermeable filter so as to permit the air pass therethrough.

With this arrangement, the air-permeable and water-impermeable filter can be prevented from being damaged soiled and clogged. There is no change in appearance, due to the provision of the air-permeable and water-impermeable filter.

According to another aspect of the present invention, there is provided a waterproof and/or water-resistant camera comprising a watertight camera body which is provided on its front wall with an opening in which the photographing lens barrel is movable in the optical axis direction, an annular seal member provided between the opening and the photographing lens barrel, and a contracting ring which is attached to the outer periphery of the annular seal member to contract the annular seal member thereby, to bring the inner peripheral edge of the annular seal member into press contact with the outer periphery of the photographing lens barrel.

With this construction, since the annular seal member is contracted by the contracting ring which is attached to the outer periphery thereof, the inner periphery of the annular seal member is brought into press contact with the outer periphery of the photographing lens barrel in a water tight fashion. Furthermore, since the annular seal member is contracted only by the contract ring rather than by the fastening portion, unlike the prior art mentioned above, and since the front surface of the annular seal member comes into press contact with the back surface defining the opening, the water tight connection can be established between the opening and the photographing lens barrel, thus resulting in need of less precision of alignment of the axes of the photographing lens barrel and the opening in which the photographing lens barrel is inserted and a smooth insertion of the photographing lens barrel in the opening.

BRIEF DESCRIPTION OF THE DRAWINGS

The invention will be described below in detail with reference to the accompanying drawings, in which:

FIGS. 2 and 3 are sectional views taken along the lines II—II and III—III in FIG. 1, respectively;

FIG. 4 is a sectional view similar to FIG. 3, but showing a modification of FIG. 3;

FIG. 13B is a perspective view of a protective cover;

FIG. 14 is a perspective view of a filter supporting portion and the vicinity thereof, according to a fifth embodiment of the present invention;

FIG. 15 is a side sectional view of a sound generator mounting portion according to a sixth embodiment of the present invention;

FIG. 16C is a side sectional view of an air-permeable and water-impermeable filter which is provided in a large diameter hole, and an arched cover (semi-cylindrical cover) attached thereto, shown in FIG. 16A;

FIG. 17 is a sectional view taken along the line XVII—XVII in FIG. 16C;

DESCRIPTION OF THE PREFERRED EMBODIMENTS

Figure 1:
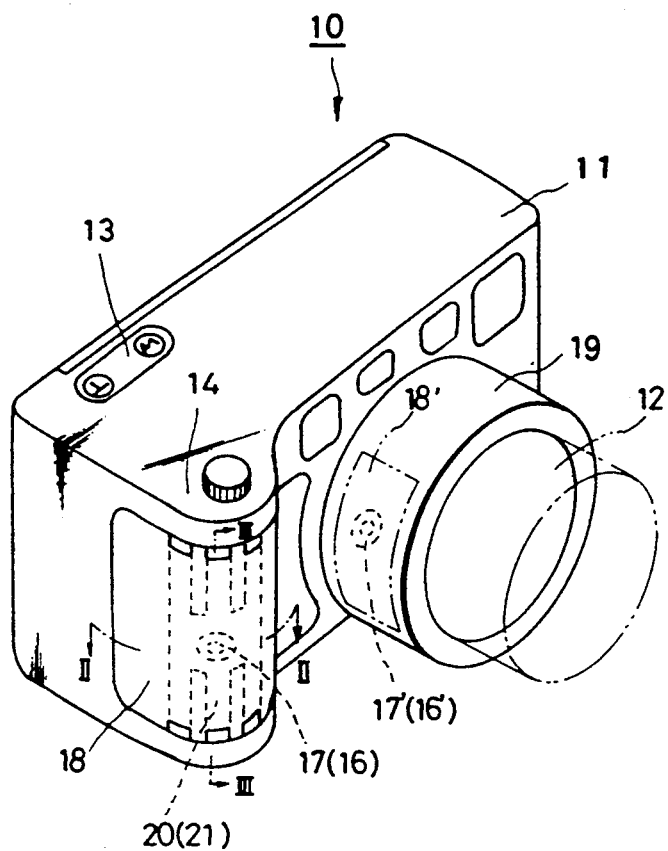
FIG. 1 is a perspective view of a waterproof and/or water-resistant camera according to a first embodiment of the present invention.

FIGS. 1 through 3 show a first embodiment of the present invention. A waterproof and/or water-resistant camera 10 of the invention has a watertight camera body 11 which has therein a movable photographing lens barrel 12 in a watertight fashion. The photographing lens barrel 12 moves in the optical axis direction, for example, in accordance with a zoom switch 13 to perform the zooming. In the course of zooming, the space (volume) in the camera body 11 including the photographing lens barrel 12 varies.

The camera body 11 has a grip portion 14 on the left portion of the front face thereof. The grip portion 14 is defined by a forward curved surface portion 15 provided on the camera body 11. The curved surface portion 15 is provided therein with an air breathing passage 16 which connects the interior and the exterior, of the camera body 11. The air breathing passage 16 is closed by an air-permeable and water-impermeable filter 17 which has a curvature substantially identical to a curvature of the curved surface portion 15. The air-permeable and water-impermeable filter 17 permits the air to permeate therethrough and does not permit the water to permeate therethrough. The air-permeable and water-impermeable filter 17 is made for example of tetrafluoroethylene resin.

In the illustrated embodiment, an arched protection cover (semi-cylindrical cover) 18 is provided to cover the air-permeable and water-impermeable filter 17 and the surroundings thereof. Thus, the air-permeable and water-impermeable filter 17 is prevented from being exposed. The semi-cylindrical cover 18 is made of, for example, synthetic resin or rubber and is bent so as to extend along the curvature of the curved surface portion 15. An air passage means is provided in the semi-cylindrical cover 18 and/or the curved surface portion 15 to connect the air-permeable and water-impermeable filter 17 to the atmosphere. The air passage means is formed for example by a connecting groove 20 formed on the inner surface of the semi-cylindrical cover 18, as shown in FIG. 3, or a connecting groove 21 formed on the outer surface of the curved surface portion 15, as shown in FIG. 4. Alternatively, it is also possible to form the semi-cylindrical cover 18 itself of an air permeable material. The semi-cylindrical cover 18 is adhered to the curved surface portion 15 by means of an adhesive or adhesive tape 22 with adhesives on the opposite surfaces, applied to the portion of the semi-cylindrical cover 18 and/or the curved surface portion 15 other than the connecting groove 20 (FIG. 3) or 21 (FIG. 4).

Alternatively, it is possible to provide an air breathing passage 16', an arched air-permeable and water-impermeable filter 17' and a semi-cylindrical cover 17' in a cylindrical stationary barrel 19 in which the movable photographing lens barrel 12 moves or the photographing lens barrel 12, as shown at an imaginary line in FIG. 1.

Figure 5:
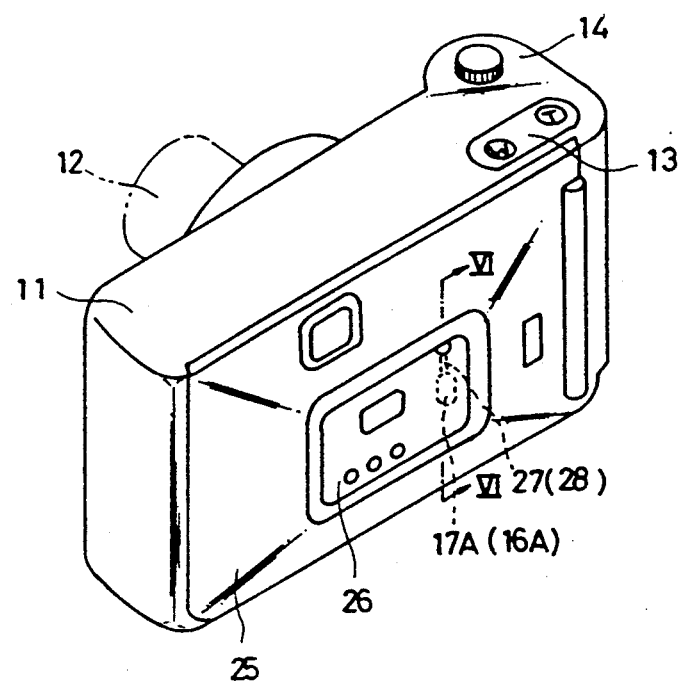
FIG. 5 is a perspective view of a waterproof and/or water-resistant camera according to a second embodiment of the present invention.
Figures 6, 7:
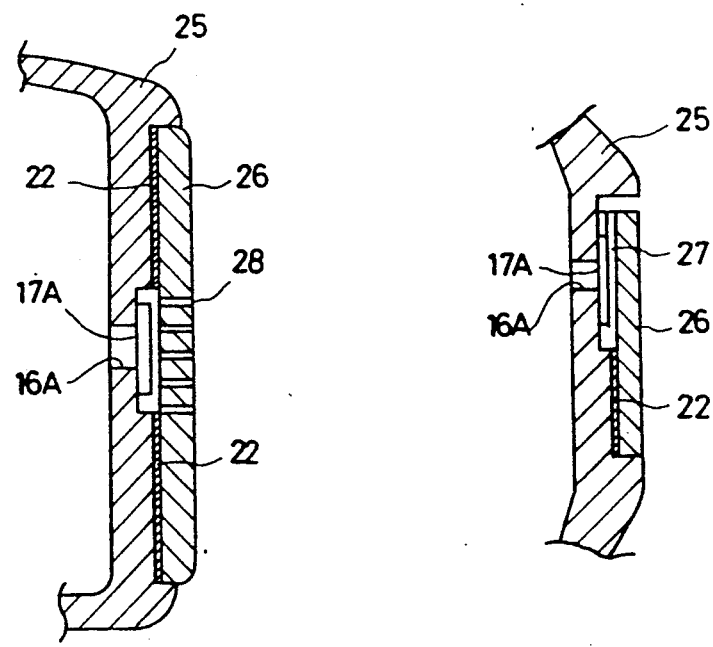
FIG. 6 is a sectional view taken along the line VI—VI in FIG. 5.
FIG. 7 is a sectional view showing a modification of FIG. 6.

FIGS. 5 through 7 show a second embodiment of the present invention.

In the second embodiment, the air breathing passage 16A is formed in a back cover 25 of the camera body 11. The air breathing passage 16A is closed by the air-permeable and water-impermeable filter 17A which is in turn covered, together with the vicinity thereof by a cover plate 26. Similar to the semi-cylindrical cover 18 in the first embodiment, the cover plate 26 and/or the back cover 25 are provided with a connecting groove 27 (FIG. 6) and/or 28 (FIG. 7) which connect(s) the air-permeable and water-impermeable filter 17A to the atmosphere. Alternatively, it is possible to form the cover plate 26 itself of an air-permeable material.

The connecting groove 27 can be formed either on the back cover 25 or on the cover plate 26, similar to the semi-cylindrical cover 18 in the first embodiment. The cover plate 26 is adhered to the back cover 25 by means of an adhesive or an adhesive tape 22 with adhesive on the opposite faces, similar to the first embodiment. The watertight connection between the camera body 11 and the back cover 25 is established by a waterproof mechanism which is known per se.

In the waterproof and/or water-resistant camera as constructed above, when there is a change in volume of the internal space of the camera body 11 defined between the photographing lens barrel 12 and the camera body 11 as a result of the movement of the photographing lens barrel 12 relative to the camera body 11, the amount of air corresponding to the volume displacement is introduced in the camera body 11 through the air-permeable and water-impermeable filter 17, 17' or 17A. Consequently, no change of the operational force of the photographing lens barrel 12 occurs due to a change in internal pressure which is caused by the volume change of the internal space of the camera body 11.

In normal use of the camera, even if water or other liquid splashes the camera (the semi-cylindrical cover 18 or 18', or the cover plate 26), less water reaches the air-permeable and water-impermeable filter 17, 17' or 17A. Even if water reaches the air-permeable and water-impermeable filter 17, 17' or 17A, the water does not permeate into camera body 11. Note that the curved filter 17 or 17' contributes to less sticking of (liquid) W (FIG. 2) to the curved surface of the filter, since the water tends to become drops of water. From the viewpoint of the contribution mentioned above, the first embodiment illustrated in FIGS. 1 through 3 (including the modification shown in FIG. 4) is more advantageous than the second embodiment illustrated in FIGS. 5 through 7.

According to the first and second embodiments mentioned above, since the air-permeable and water-impermeable filter 17, 17' or 17A is covered by the semi-cylindrical cover 18, the bent cover 18' or the cover plate 26, neither the photographer's hands nor surrounding foreign matter can come directly into contact with the air-permeable and water-impermeable filter 17, 17' or 17A. Thus, the air-permeable and water-impermeable filter 17, 17' or 17A is prevented from being damaged, soiled and clogged.

In the above-mentioned first and second embodiments, the semi-cylindrical cover 18, the bent cover 18' or the cover plate 26 is adhered by the adhesive or the adhesive tape 22. However, it is possible to detachably mount the cover (18 etc.) by hooks or machine screws or both. Detachably mounting the cover makes it easier to exchange the old air-permeable and water-impermeable filter (17, etc.) for a new one, for example if the old air-permeable and water-impermeable filter becomes clogged.

Figure 8:
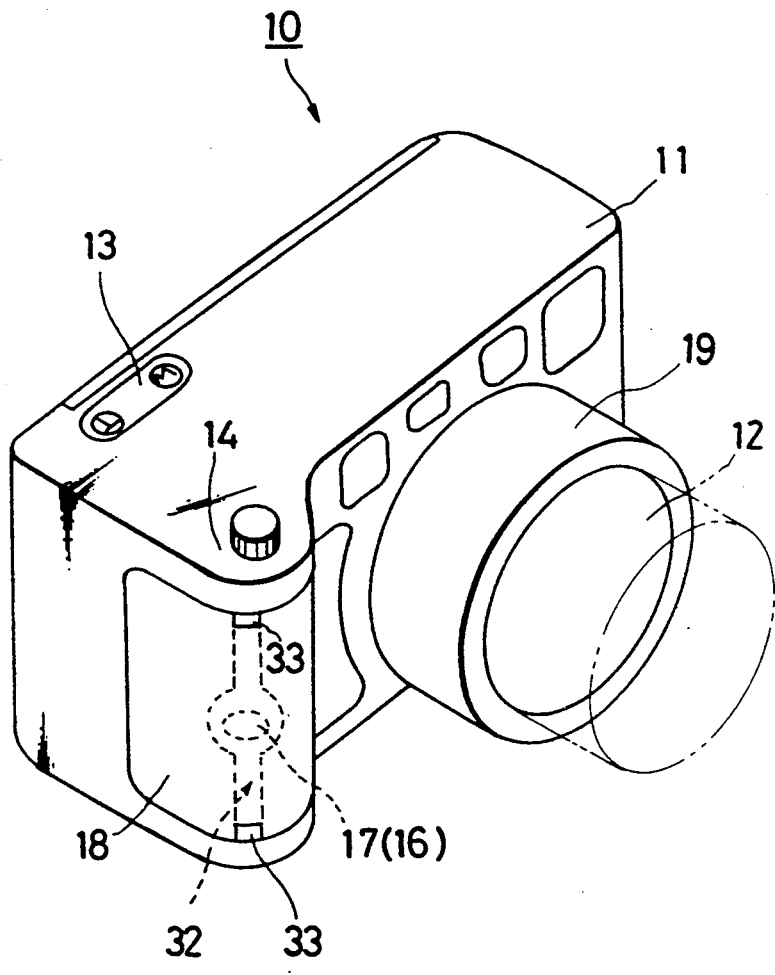
FIG. 8 is a schematic view of a waterproof and/or water-resistant camera according to a third embodiment of the present invention.
Figure 9A:
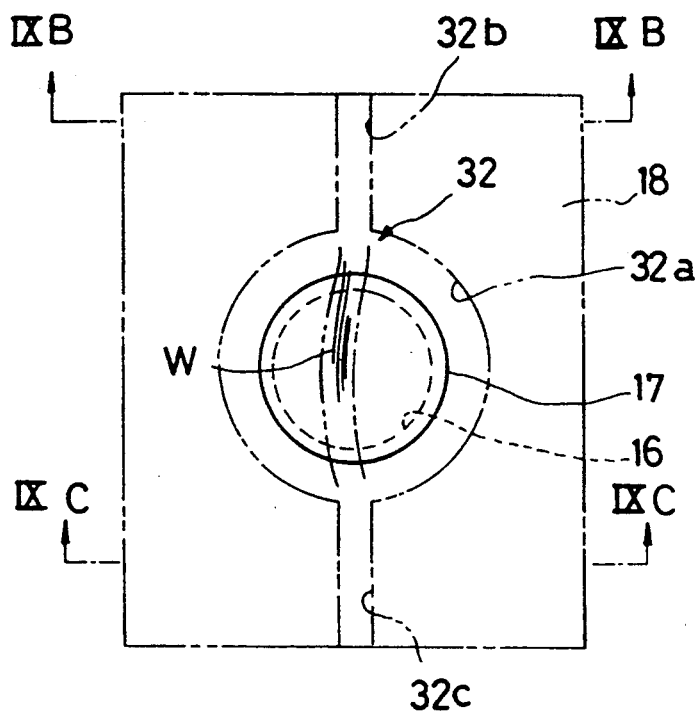
FIG. 9A is a schematic view of a connecting groove formed in a protection cover and an air-permeable and water-impermeable filter, according to the present invention.
Figure 9B:
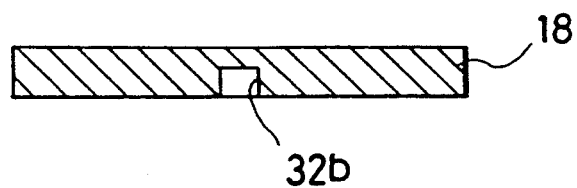
FIG. 9B is a sectional view taken along the line IX B—IX B in FIG. 9A.
Figure 9C:
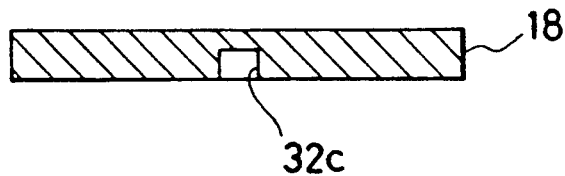
FIG. 9C is a sectional view taken along the line IX C—IX C in FIG. 9A.
Figure 10:
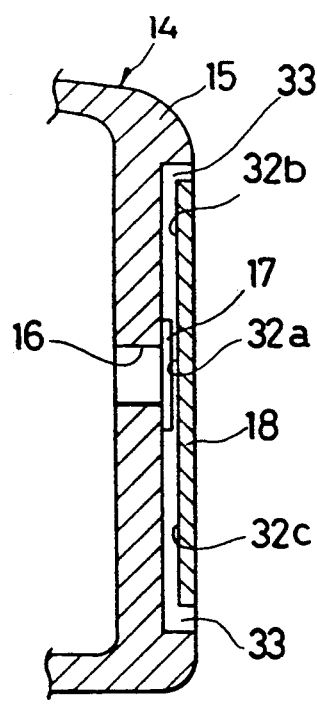
FIG. 10 is a side sectional view of FIG. 9A.
Figure 11:
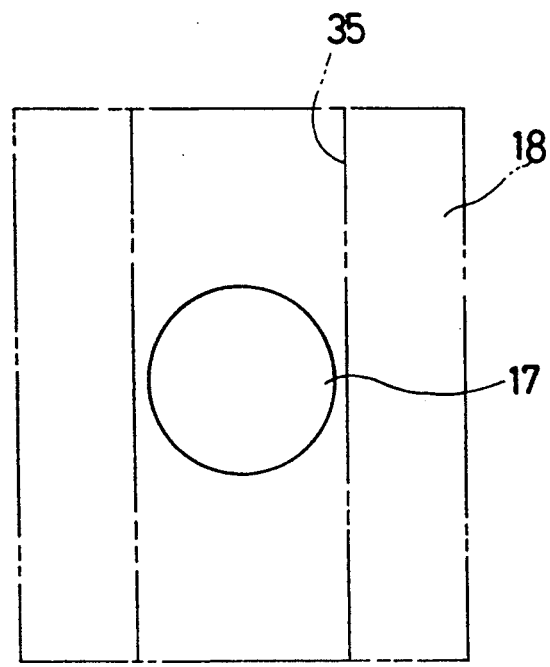
FIG. 11 is a schematic view of a connecting groove formed in a protection cover and an air-permeable and water-impermeable filter, in a basic arrangement to which the improvement of the present invention according to the third embodiment is applied.

The following discussion will be directed to a third embodiment as shown in FIGS. 8 through 10, in which grip portion 14 is provided with the air breathing passage 16, which is in turn provided with the air-permeable and water-impermeable filter 17, so that the water flowing into the camera body from above does not decrease the air-permeability of the air-permeable and water-impermeable filter 17. In the third embodiment, the components corresponding to those of the first and second embodiments mentioned before are designated with the same reference numerals.

The air breathing passage 16 is formed in the curved surface portion 15 of the grip portion 14 to connect the interior and the exterior of the camera body 11. The circular air-permeable and water-impermeable filter 17 made of water repellent material is mounted to the grip portion 14 to close the air breathing passage 16. The protection cover 18 is provided on the grip portion 14 to cover the curved surface portion 15 thereby protecting air-permeable and water-impermeable filter 17. The protection cover 18 is provided with a connecting groove 32, as shown in FIG. 9A. The connecting groove 32 is provided on upper and lower ends with cut-away portions 33 which connect with connecting passage 32, and accordingly, the air-permeable and water-impermeable filter 17 to the atmosphere.

The connecting groove 32 has a circular center groove portion 32a corresponding to the air-permeable and water-impermeable filter 17. Also, the connecting groove 32 has an upper air connecting groove portion 32b connected to the center groove portion 32a, and a lower air connecting groove portion 32c connected to the center groove portion 32a. The upper air connecting groove portion 32b serves as an air inlet port when the camera is located in a normal posture, or an air outlet port when the camera posture is inverted. The lower air connecting groove portion 32c serves as an air outlet port when the camera is located in a normal posture, or an air inlet port when the camera posture is inverted.

The center groove portion 32a is circular to correspond to the circular air breathing passage 16 (or the circular air-permeable and water-impermeable filter 17). The diameter of the center groove portion 32a is substantially identical to or slightly larger than the air-permeable and water-impermeable filter 17. The cross sectional area of the upper and lower air connecting groove portions 32b and 32c is smaller than that of the air breathing passage 16. Consequently, even if water penetrates the camera body through the upper air connecting groove portion 32b, water does not spread over the whole surface of the air-permeable and water-permeable filter 17, but flows into the lower air connecting groove portion 32c. The same is true when the camera posture is inverted. Namely, the water penetrating the camera body through the lower air connecting groove portion 32c which is now directed upward flows down into the upper air connecting groove portion 32b which is now directed downward, without spreading over the whole surface of the air-permeable and water-impermeable filter 17.

In the waterproof and/or water-resistant camera 10, as constructed above, when the photographing lens barrel 12 moves relative to the camera body 11, the volume of the internal space of the camera body 11 and the photographing lens barrel 12 varies. As a result, the amount of air corresponding to the variation of the volume enters the camera body 11 through the connecting groove 32 of the protection cover 18, the air-permeable and water-impermeable filter 17 and the air breathing passage 16. Consequently, there is no change of the operational force of the photographing barrel 12 due to the variation of the internal pressure of the camera body 11 and the photographing lens barrel 12.

When water enters the camera body 11 through the upper cut-away portions 33, the water flows in the upper connecting groove portion 32b, reaches the air-permeable and water-impermeable filter 17, flows into the lower connecting groove portion 32c, and is discharged from the camera through the lower cut-away portion 33. Since the cross sectional area of the air breathing passage 16 which is covered by the air-permeable and water-impermeable filter 17 is larger than that of the upper connecting groove portion 32b, even if water penetrates the camera body through the upper connecting groove portion 32b, water does not spread over the whole surface of the air-permeable and water-impermeable filter 17 and flows into the lower air connecting groove portion 32c, as shown by an arrow W in FIG. 9. The same is true when the camera posture is inverted. Namely, the water penetrating the camera body through the lower air connecting groove portion 32c which is now directed upward flows into the upper air connecting groove portion 32b which is now directed downward, without spreading over the whole surface of the air-permeable and water-impermeable filter 17, thus resulting in no decrease of air-permeability of the air-permeable and water-impermeable filter 17.

Figure 12:
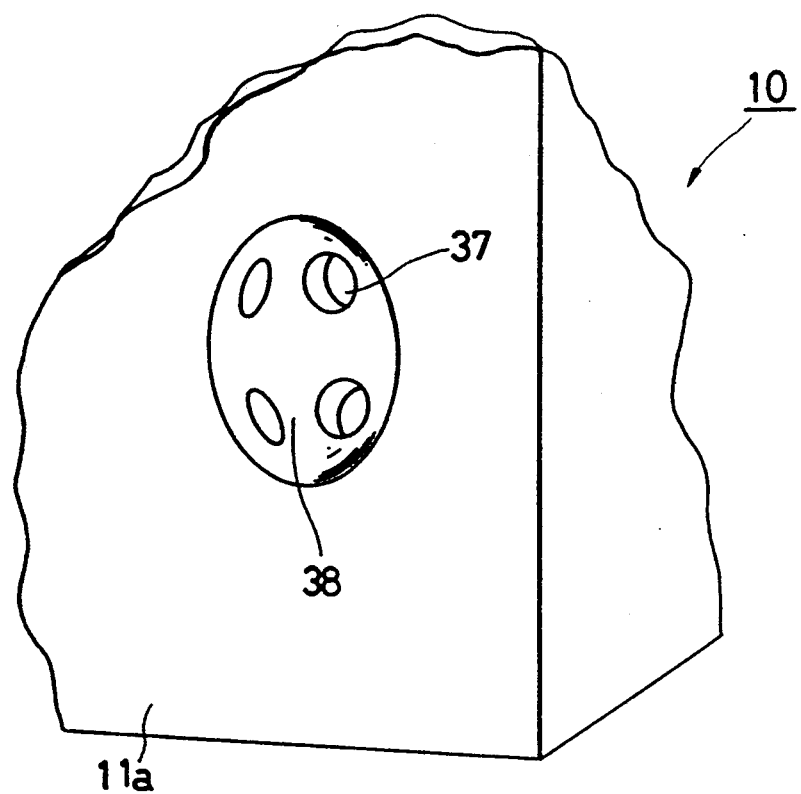
FIG. 12 is a partially broken perspective view of a main part of a waterproof and/or water-resistant camera according to a fourth embodiment of the present invention.
Figure 13A:
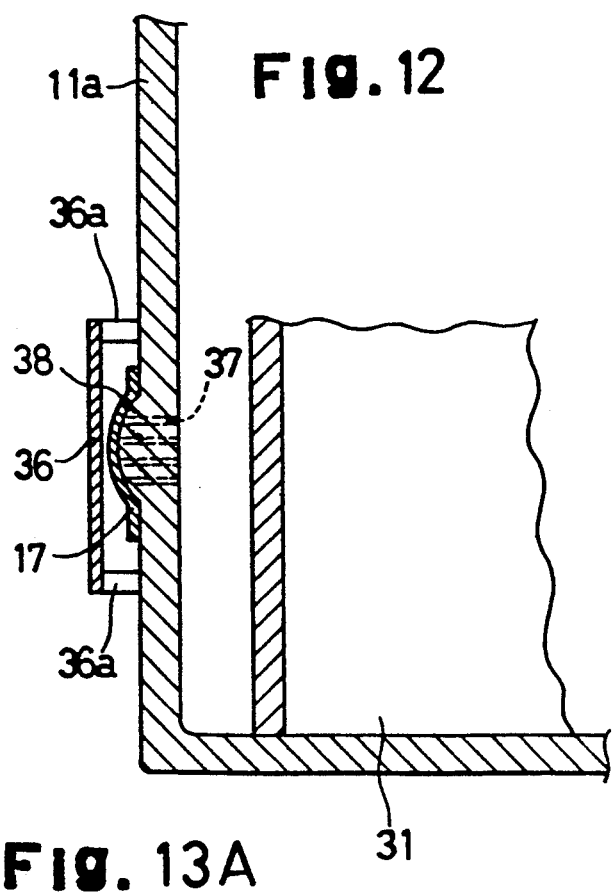
FIG. 13A is a side sectional view of FIG. 12.

FIGS. 12, 13A and 13B show a fourth embodiment of the present invention.

In the fourth embodiment, the camera 10 has a semi-spherical filter supporting portion (projection) 38 formed on the right end portion of the front wall 11a of the camera body 11. The filter supporting portion 38, which will be referred to as a filter support, has four separate small circular air breathing holes (passages) 37. These air breathing holes 37 are covered by the air-permeable and water-impermeable filter 17 which is mounted to the filter support 38 and which is bent to correspond to the semi-spherical shape of the filter support. The air breathing holes 37 which are spaced from one another prevent the air-permeable and water-impermeable filter 17 from being deformed during the passage of the air therethrough.

Preferably, the diameter of the air breathing holes 37 is 3~4 mm. If the air-permeable and water-impermeable filter 17 has a large thickness, enough to self-maintain the shape thereof, it is possible to prepare a semi-spherical air-permeable and water-impermeable filter 17. The increased thickness of the air-permeable and water-impermeable filter 17 increases the strength thereof and the resistance against the deformation due to the passage of the air therethrough.

Protection cover 36 is provided in front of the filter support 38 and the air-permeable and water-impermeable filter 17. The protection cover 36 has a number of peripheral connecting grooves 36a spaced from one another in the circumferential direction of cover 36 to connect the air-permeable and water-impermeable filter 17 to the atmosphere and protect the air-permeable and water-impermeable filter 17 from being damaged, broken, soiled, or clogged, etc.

In FIG. 13A, numeral 31 designates an internal mechanism of the camera for operating various electronic elements and electronic circuit boards, etc.

In the fourth embodiment, when the photographing lens barrel 12 moves relative to the camera body 11, the volume of the internal space of the camera body 11 and the photographing lens barrel 12 varies. As a result, the amount of air corresponding to the variation of volume enters the camera body 11 through the connecting grooves 36a of the protection cover 36, the air-permeable and water-impermeable filter 17 and the air breathing holes 37. Since the air-permeable and water-impermeable filter 17 is supported by and on the semi-spherical filter support 38 and since a plurality of small air breathing holes 37 are distributed on the filter support, less deformation of the air-permeable and water-impermeable filter 17 occurs due to the passage of the air, in comparison with the case where a large single air breathing hole is provided in the filter support 38. This results in less air noise produced by the deformation of the air-permeable and water-impermeable filter 17 and less deterioration of the air-permeable and water-impermeable filter 17 due to repeated deformation.

The semi-spherical shape of the air-permeable and water-impermeable filter 17 contributes to the prevention of water remaining thereon.

FIG. 14 shows a fifth embodiment of the present invention.

The filter support 42 has two intersecting bridge portions 42a and 42b which are curved archwise and four breathing holes (passages) 43 which located in the four quadrants defined by the two bridge portions 42a and 42b. The air-permeable and water-impermeable filter 17 (as shown in FIG. 13) is bent on and along the arched surfaces of the bridge portions 42a and 42b, so that the air flowing from and into the air breathing holes 43 can permeate through the air-permeable and water-impermeable filter 17. Thus, the filter support 42 fulfills the same or function as that of filter support 38 shown in FIGS. 12 and 13.

FIG. 15 shows a sixth embodiment of the present invention, in which sound generated in the camera body can be transmitted to the outside of the camera body. In the sixth embodiment, no filter 38 or 42 as shown in FIG. 12 or FIG. 14, respectively, is provided.

In FIG. 15, the air breathing passage 16 is formed in the front wall 11a of the camera body 11 and is closed by the air-permeable and water-impermeable filter 17 which is adhered to the front of the camera body. The protection cover 36 is provided on the front wall 11a of the camera body 11 to correspond to the air-permeable and water-impermeable filter 17. In the camera body 11 there is provided an internal functioning mechanism 31 operating the camera, close to the front wall 11a. The internal functioning mechanism 31 has a printed circuit board 45 provided thereon. A sound generator 46 which tells the release timing, is provided on the printed circuit board 45 located to correspond with the air breathing passage 16.

Consequently, when the photographing lens barrel 12 moves relative to the camera body 11, the volume of the internal space of the camera body 11 varies. As a result, the amount of air corresponding to the variation of the volume enters the camera body 11 through the connecting grooves 36a of the protection cover 36, the air-permeable and water-impermeable filter 17 and the air breathing hole 16. For instance, in case of self-timer photographing, the sound waves generated by the sound generator 46 are propagated to the outside of the camera through the air breathing passage 16 located in front of the sound generator 46, the air-permeable and water-impermeable filter 17 and the connecting grooves 36a of the protection cover 36 immediately before the release operation starts.

Thus, the sound generated in the camera body 11 is audibly propagated to a photographer, in spite of the waterproof and/or water-resistant mechanism of the camera 10.

The sound generator 46 can be a buzzer which warns of, for example, impossibility of focusing, etc.

Figures 16A, 16B:
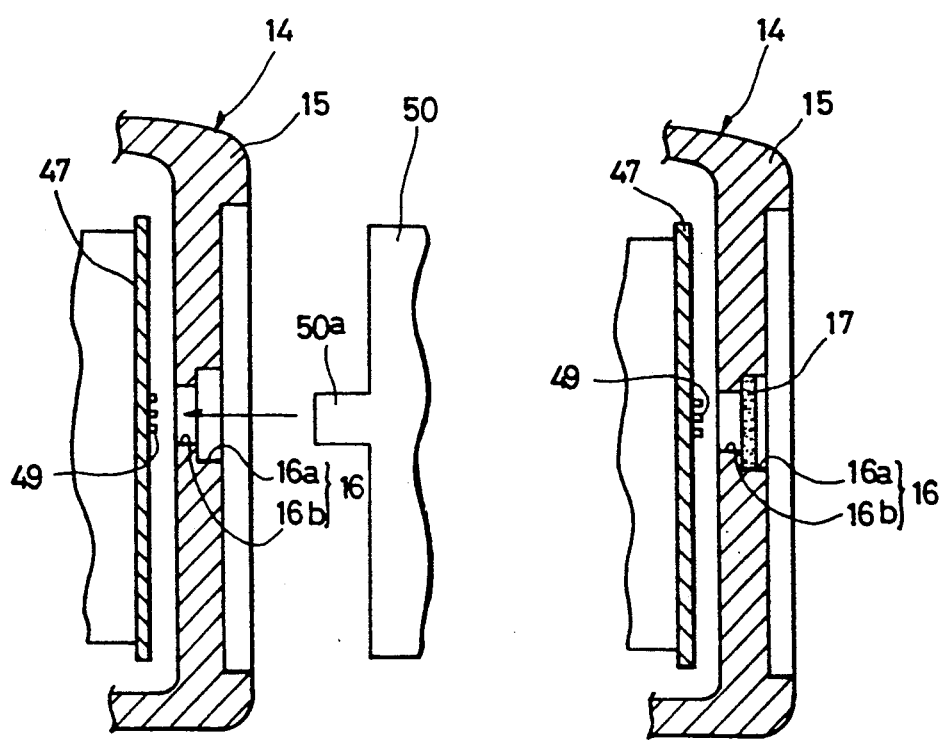
FIG. 16A is a side sectional view of a grip portion having therein a check land, upon inspection, according to a seventh embodiment of the present invention.
FIG. 16B is a side sectional view of an air-permeable and water-impermeable filter which is provided in a large diameter hole shown in FIG. 16A.

The following discussion will be directed to a seventh embodiment of the present invention as shown in FIGS. 16A through 17. A check land 47 is provided in the vicinity of the air breathing passage to check various operations and functions of the camera before the air-permeable and water-impermeable filter is adhered to the camera body.

The stepped air breathing passage 16 which is formed in the grip portion 14 of the camera body 11, has a large diameter hole 16a and a small diameter hole 16b connected to the large diameter hole 16a. The arched large diameter hole 16a has a substantially same curvature as that of the curved surface portion 15 of the grip portion 14. The air-permeable and water-impermeable filter 17 which has substantially the same curvature as the curved surface portion 15 is fitted in and adhered to the large diameter hole 16a, as can be seen in FIG. 17. The semi-cylindrical cover 18 is adhered to the curved surface portion 15 of the grip portion 14 to surround the air-permeable and water-impermeable filter 17 and vicinity thereof.

The check land 47 is provided behind the curved surface portion 15 in the camera body 11 to check a camera control circuit (not shown). The check land 47 is of semi-cylindrical shape and extends along the curved surface portion 15. The check land 47 is provided, on a center portion corresponding to the small diameter hole 16b, with a plurality of terminals 49 which can be exposed through the air breathing passage 16, to check the various operations and functions of the camera 10. A front contact 50a of an inspecting device 50, can be inserted in the air breathing passage 16 (large diameter hole 16a and small diameter hole 16b) from the outside of the curved surface portion 15, and can be brought into contact with the checking terminals 49, upon a checking operation. The front contact 50a has, for example a plurality of inspecting probes known (not shown).

When the photographing lens barrel 12 moves relative to the camera body 11, the volume of the internal space of the camera body 11 varies. As a result, the amount of air corresponding to the variation of the volume enters the camera body 11 through the air-permeable and water-impermeable filter 17. Consequently, no change in the operational force in the photographing lens barrel 12 occurs due to variation of the internal pressure of photographing lens barrel 12 and the camera body 11.

If the semi-cylindrical cover 18 is splashed with water (or other liquid), only a small amount of water reaches the air-permeable and water-impermeable filter 17. Even if the water reaches the air-permeable and water-impermeable filter 17, no water can permeate into the camera body 11 through filter 17. Thus, water non-permeability can be ensured.

Furthermore, since the air-permeable and water-impermeable filter 17 is covered by the semi-cylindrical cover 18, neither the operator's hands nor surrounding foreign matter can come into contact with the air-permeable and water-impermeable filter 17. Thus, the air-permeable and water-impermeable filter 17 prevented from being damaged, broken, soiled and clogged. Additionally, the problem where the battery cover or the back cover of the camera is not actuated to open due to the pressure difference between the outside and the inside of the camera body 11 can be eliminated.

The following description will address the inspecting system of the operations and functions of the camera body 10, for example, upon assembly.

Upon checking, the semi-cylindrical cover 18 is not attached to the curved surface portion 15 of the camera body 11 of the waterproof and/or water-resistant camera 10, and the air-permeable and water-impermeable filter 17 is not attached to the large diameter hole 16a of the air breathing passage 16, so that the checking terminals 49 of the check land 47 are exposed through the air breathing passage 16 (large diameter hole 16a and small diameter hole 16B). As shown in FIG. 16A, the contact 50a of the inspecting device 50 is inserted in the large diameter hole 16a and the small diameter hole 16b and brought into contact with the checking terminals 49. As a result, the signals are transmitted from the checking probes of the front contact 50a to the checking terminals 49 and vice versa. Thus, the operations and functions of the waterproof and/or water-resistant camera 10 can be checked before shipping.

After the checking operation is completed, the front contact 50a of the inspection device 50 is removed from the air breathing passage 16 (large diameter hole 16a and the small diameter hole 16b). Thereafter, the air-permeable and water-impermeable filter 17 is attached to the large diameter hole 16a as shown in FIG. 16C. Thereafter, the semi-cylindrical cover 18 is adhered to the front curved surface portion 15 by the adhesive or the adhesive tape 22 which is applied to the portion of the curved surface portion 15 other than the connecting grooves 20 of the semi-cylindrical cover 18 as shown in FIG. 16C.

Alternatively, it is possible to detachably attach the semi-cylindrical cover 18 to the curved surface portion 15 by means of hook(s) or machine screw(s) or both rather than the adhesive or the adhesive tape 22. Such a detachable attachment of the semi-cylindrical cover 18 makes it possible to easily exchange the old semi-cylindrical cover 18 for a new one, for example, if the former is clogged.

Alternatively, it is integrally possible to integrally make the air-permeable and water-impermeable filter 17 and the semi-cylindrical cover 18 integral, so that both the air-permeable and water-impermeable filter 17 and the semi-cylindrical cover 18 can be detached from the camera body at one time.

Furthermore, it is also possible to form the air breathing passage 16 (large diameter hole 16a and the small diameter hole 16b) in the side face, the bottom face or the back face of the camera body 11. In this alternative, the check land 47 is provided in a position corresponding to the large diameter hole 16a and the small diameter hole 16b, so that the checking terminals 49 are exposed in the portion another than the grip portion 14. In this case, the semi-cylindrical cover 18 is replaced with other cover close the large diameter hole 16a.

Figure 18:
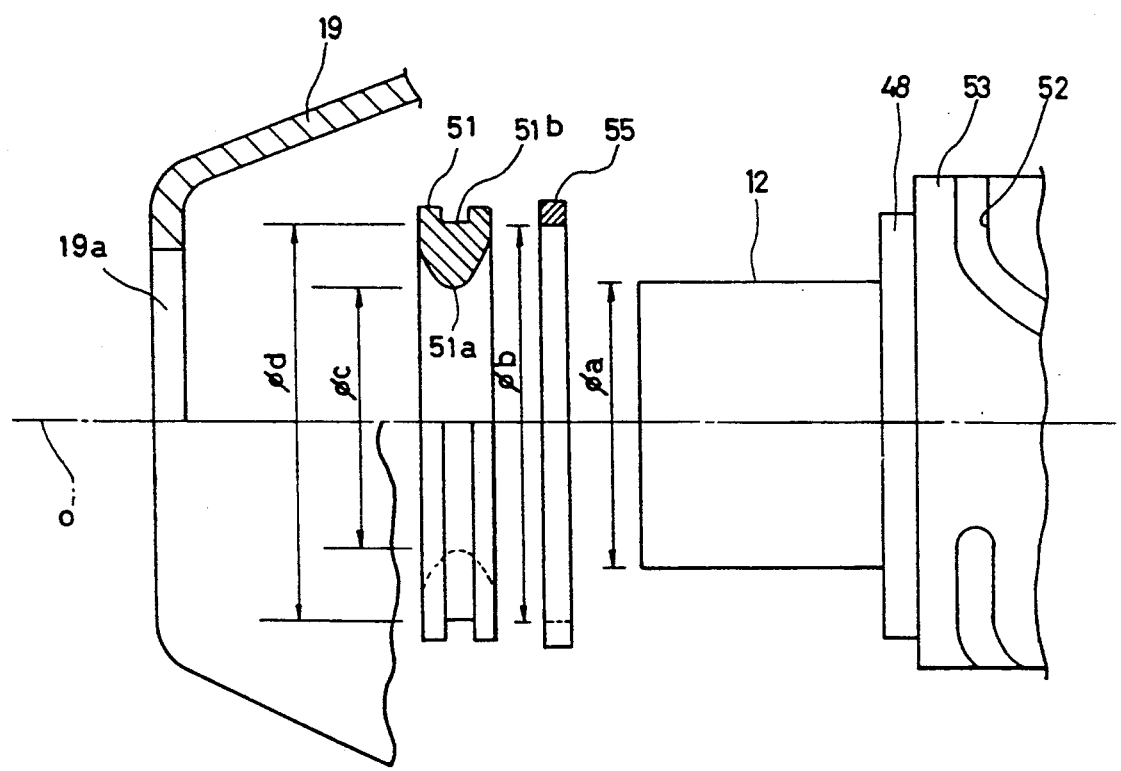
FIG. 18 is an exploded side elevational view of main components of a waterproof and/or water-resistant camera according to a eighth embodiment of the present invention.
Figure 19:
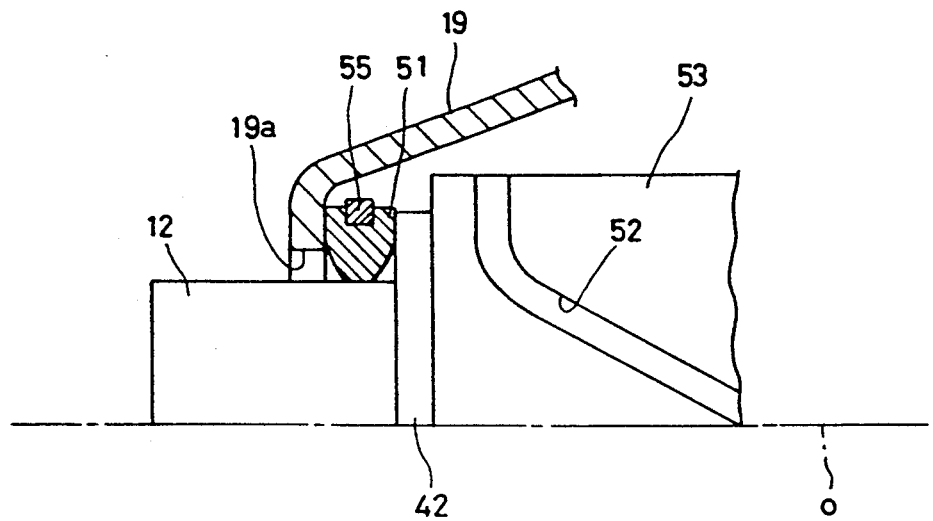
FIG. 19 is a side elevational view of a main part of FIG. 18, shown in an assembled position.
Figure 20:
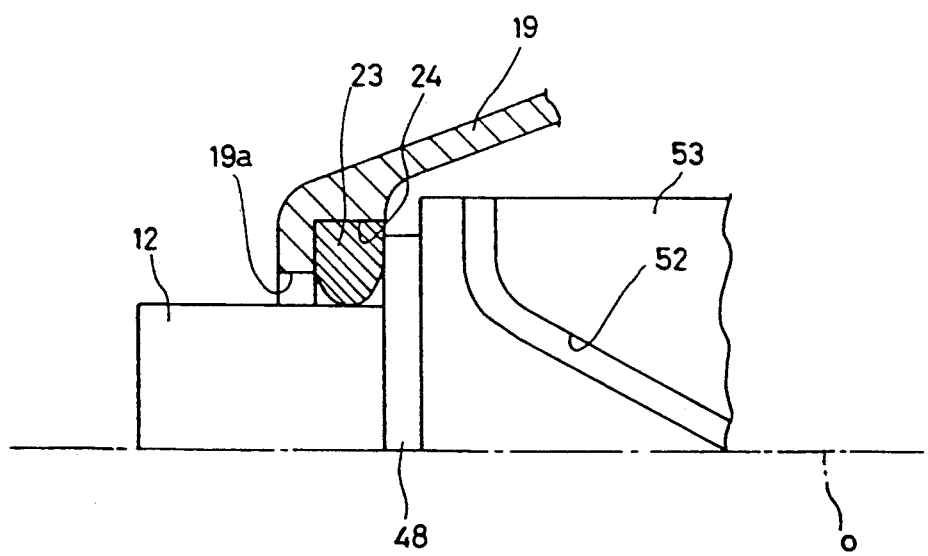
FIG. 20 is a prior art side elevational view of a watertight mechanism of a photographing lens in a basic arrangement.
Figure 21:
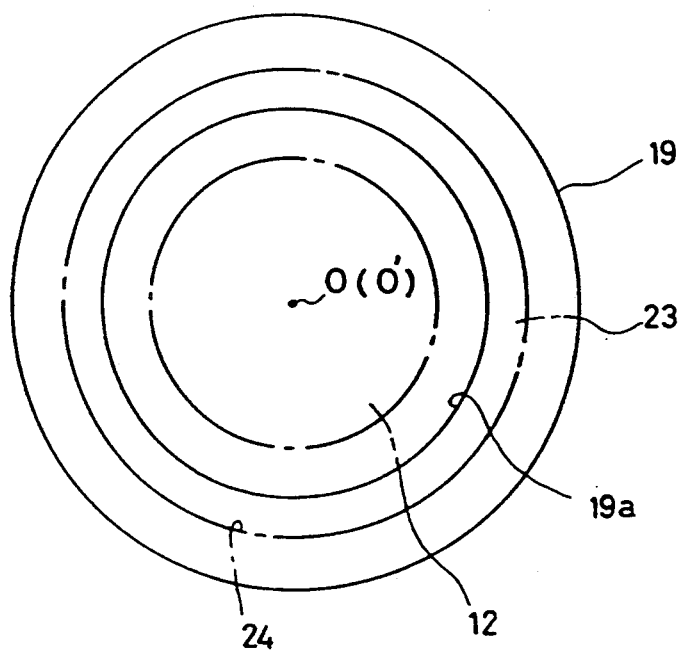
FIG. 21 is a prior art schematic left end view of FIG. 20.
Figure 22:
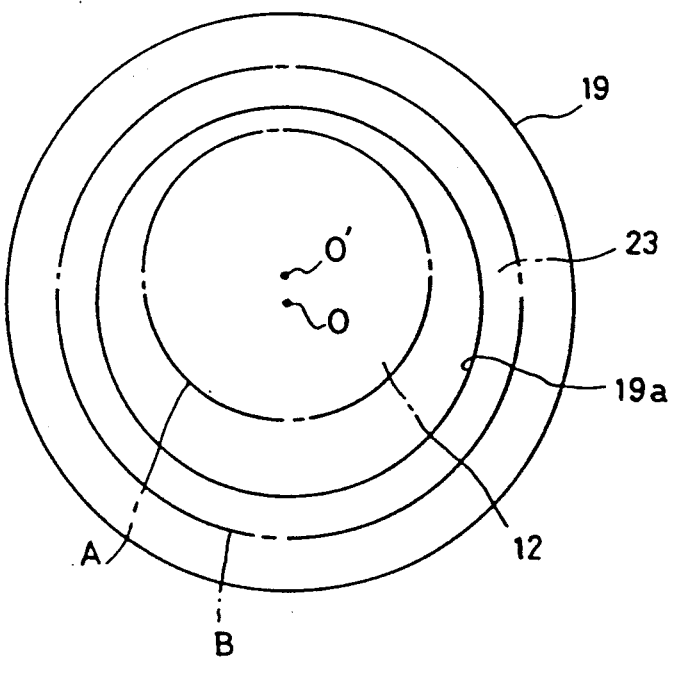
FIG. 22 is a prior art schematic view of an eccentric photographing lens barrel shown in FIG. 20.

FIGS. 18 and 19 show an eighth embodiment of the present invention, in which the stationary barrel 19 is provided on the front wall 11a of the camera body 11. The stationary barrel 19 is provided on its front end with an opening 19a in which moves the photographing lens barrel 12 which is supported by the camera body 11. The photographing lens barrel 12 is moved in the optical axis direction O in accordance with the operation of the zoom switch 13 provided on the upper surface of the camera body 11.

A stationary ring 48, secured to the camera body 11, is provided in the stationary barrel 19. The stationary ring 48 is fitted in a cam ring 53 which is provided, on a side face, with a cam groove 52, so that the cam ring 53 can be rotated relative to the stationary ring 48. The photographing lens barrel 12 is slidably fitted in the stationary ring 48, so that when the cam ring 53 is rotated by a zoom motor (not shown), the photographing lens barrel 12 is moved in the optical axis direction O.

An annular seal member 51 has an inner projecting edge 51a and an outer peripheral groove 51b. In the peripheral groove 51b is fitted a contracting ring 55 which has a width substantially identical to that of the peripheral groove 51b. The contracting ring 55 is made of a material having rigidity, such as synthetic resin or metal, etc., uniformly contracts the diameter of the annular seal member 51 without being distorted, due to the rigidity of the contracting ring 55.

The outer diameter $\phi a$ of the photographing lens barrel 12, the inner diameter $\phi b$ of the contracting ring 55, the outer diameter $\phi d$ of the peripheral groove 51b, and the inner diameter $\phi c$ of the annular seal member 51 when the contracting ring 55 is fitted in the peripheral groove 51b, satisfy the following relationships:

$$\phi a > 1 \dot c, \phi b \leqq \phi d$$

Upon assembly, the contracting ring 55 is first fitted in the peripheral groove 51b of the annular seal member 51 to contract the latter. Thereafter, the photographing lens barrel 12 is fitted in the annular seal member 51. Since the annular seal member 51 is uniformly contracted without being distorted by the engagement of the rigid contracting ring 55 into the peripheral groove 51b of the annular seal member 51, the inner peripheral edge 51a of the annular seal member 51 is brought into contact with the outer peripheral surface of the photographing lens barrel 12 in a watertight fashion.

After the photographing lens barrel 12 is inserted in opening 19a of the stationary barrel 19, the annular seal member 51 is pressed from behind by the stationary barrel 19. Since the width of the annular seal member 51 is increased (in the optical axis direction O) because of the fitting of the contracting ring 55 into the peripheral groove 51b and the fitting of the annular seal member 51 into the photographing lens barrel 12, the front end portion of the annular seal member 51 is brought into contact with the back surface of the stationary barrel 19 that defines the opening 19a, in a watertight fashion. Thus, a watertight connection between the photographing lens barrel 12 and the opening 19a is established.

Since the annular seal member 51 is uniformly contracted without being distorted by the contracting ring 55, no deviation of the annular seal member from the center axis of the photographing lens barrel 12 occurs. Consequently, the watertight connection between the photographing lens barrel 12 and the stationary barrel 19 is enhanced by the annular seal member 51 without increasing the slide resistance of the photographing lens barrel 12.

The annular seal member 51 establishes the watertight connection between the photographing lens barrel 12 and the opening 19a with the help of the press contact of the front end of the annular seal member 51 with the back wall of the stationary barrel 19 in the vicinity of the opening 19a, and accordingly, even if there is a slight eccentricity of the photographing lens barrel 12 with respect to the opening 19a, the annular seal member 51 ensures the watertight connection without being influenced thereby.

Although, in the illustrated embodiment, $$\phi b \leqq \phi d,$$

$\phi b$ could be larger than $\phi d$ ($\phi b > \phi d$), if the inner diameter of the inner peripheral edge 51a of the annular seal member 51 is remarkably smaller than the outer diameter of the photographing lens barrel 12, so that the annular seal member 51 is expanded and increases the diameter of annular seal member 51.

We claim:

1. A waterproof and/or water-resistant camera, comprising:
   a movable photographing lens barrel which moves in the optical axis direction of the camera;
   said camera including a curved surface portion;
   an air breathing passage formed in said curved surface portion for connecting the interior and the exterior of the camera;
   an air-permeable and water-impermeable filter provided in the air breathing passage, and,
   a protection cover which covers the air-permeable and water-impermeable filter and constitutes an air connecting means for the air-permeable and water-impermeable filter.

2. A waterproof and/or water-resistant camera according to claim 1, further comprising a grip portion having said curved surface portion projecting forwardly, and wherein said air breathing passage is formed in the curved surface portion.

3. A waterproof and/or water-resistant camera according to claim 2, wherein said air-permeable and water-impermeable filter is bent along the curved surface portion.

4. A waterproof and/or water-resistant camera according to claim 2, wherein said camera includes a camera body having a control circuit therein.

5. A waterproof and/or water-resistant camera according to claim 4, further comprising a check land for checking the control circuit of the camera body.

6. A waterproof and/or water-resistant camera according to claim 5, wherein said check land has check terminals which are provided in a wall of the camera body, so that the air breathing passage is formed in the wall of the camera body so as to correspond to the check terminals.

7. A waterproof and/or water-resistant camera according to claim 5, wherein said check terminals of the check land are located in the vicinity of the grip portion in the camera body.

8. A waterproof and/or water-resistant camera according to claim 6, wherein said check terminals of the check land can be connected to a front end of an inspecting device which can be inserted in the air breathing passage when the air-permeable and water-impermeable filter is removed.

9. A waterproof and/or water-resistant camera according to claim 1, wherein said protection cover is semi-cylindrical to cover the curved surface portion of the grip portion.

10. A waterproof and/or water-resistant camera according to claim 9, wherein said air connecting means comprises at least one air connecting groove formed in the semi-cylindrical protection cover.

11. A waterproof and/or water-resistant camera according to claim 9, wherein said air connecting means comprises at least one air connecting groove formed in the curved surface portion of the grip portion.

12. A waterproof and/or water-resistant camera according to claim 1, further comprising a stationary barrel, so that said air breathing passage is formed in the peripheral surface of the stationary barrel.

13. A waterproof and/or water-resistant camera according to claim 12, wherein said protection cover is bent along the peripheral surface of the stationary barrel.

14. A waterproof and/or water-resistant camera according to claim 12, wherein said protection cover has a curved profile corresponding to the peripheral surface of the stationary barrel.

15. A waterproof and/or water-resistant camera according to claim 1, wherein said protection cover is detachably attached to the camera body.

16. A waterproof and/or water-resistant camera according to claim 1, further comprising a filter support formed on a front wall of a camera body.

17. A waterproof and/or water-resistant camera according to claim 1, further comprising a sound generator located to correspond to the air breathing passage in a camera body.

18. A waterproof and/or water resistant camera according to claim 1, further comprising a camera body which has an opening in which the photographing lens barrel is movable, and an annular seal member between the opening of the camera body and the photographing lens barrel.

19. A waterproof and/or water-resistant camera according to claim 18 further comprising a contracting ring which is attached to the outer periphery of the annular seal member to contract the diameter of the annular seal member to bring the inner peripheral edge of the annular seal member into press contact with the outer periphery of the photographing lens barrel.

20. A waterproof and/or water-resistant camera according to claim 19, wherein said annular seal member is provided, on its outer periphery, with a peripheral groove in which the contracting ring is fitted.

21. A waterproof and/or water-resistant camera according to claim 20, wherein there is a following relationship:

$$\phi a > \phi c, \phi b \leq \phi d$$

wherein $\phi a$: outer diameter of the photographing lens barrel, $\phi b$: inner diameter of the contracting ring, $\phi c$: inner diameter of the annular seal member when the contracting ring is fitted in the peripheral groove thereof, $\phi d$: outer diameter of the peripheral groove of the annular seal member.

22. A waterproof and/or water-resistant camera according to claim 19, wherein said contracting ring is made of synthetic resin.

23. A waterproof and/or water-resistant camera according to claim 19, wherein said contracting ring is made of metal.

24. A waterproof and/or water-resistant camera having a watertight camera body which is provided on its wall with an air breathing passage for connecting the interior and exterior of the camera body, and an air-permeable and water-impermeable filter attached to the air breathing passage, comprising a protection cover which covers the air-permeable and water-impermeable filter and which has a center connecting groove corresponding to the air breathing passage, an inlet connecting groove connected to the center connecting groove and an outlet connecting groove from which water which may enter the camera body through the inlet connecting groove can be discharged, said inlet and outlet connecting grooves having a cross sectional area smaller than that of the air breathing passage.

25. A waterproof and/or water-resistant camera comprising a watertight camera body which is provided on its wall with a filter support having a curved surface and a plurality of air breathing holes for connecting the interior and exterior of the camera body, and an air-permeable and water-impermeable filter which is attached to the filter support along the curved surface thereof to close the air breathing holes.

26. A waterproof and/or water-resistant camera comprising a watertight camera body which has therein a sound generator, said camera body being provided on its wall with an air breathing passage for connecting the interior and exterior of the camera body, said sound generator being opposed to the air breathing passage in the camera body.

27. A waterproof and/or water-resistant camera comprising a watertight camera body which has therein a control circuit, and a check land provided in the camera body, having check terminals provided in the vicinity of a wall thereof, said camera body being provided, on the portion of the wall corresponding to the check terminals, with an air breathing passage for connecting the interior and exterior of the camera body, and an air-permeable and water-impermeable filter which is attached to the air breathing passage to close the same.

28. In a waterproof and/or water-resistant camera comprising a watertight camera body which is provided on its front wall with an opening in which the photographing lens barrel is movable in the optical axis direction, and an annular seal member provided between the opening and the photographing lens barrel, wherein the improvement comprises a contracting ring which is mounted to the outer periphery of the annular seal member to contract the seal member thereby, to bring the inner peripheral edge of the seal member into press contact with the outer periphery of the photographing lens barrel.

29. A waterproof and/or water-resistant camera, comprising:
a back cover;
a movable photographing lens barrel which moves in the optical axis direction of the camera;
an air breathing passage for connecting the interior and the exterior of the camera, said air breathing passage being formed in said back cover;
an air-permeable and water-permeable filter provided in the air breathing passage, and, a protection cover which covers the air-permeable and water-impermeable filter and constitutes an air connecting means for the air-permeable and water-impermeable filter.

30. A water roof and/or water-resistant camera according to claim 29, wherein said protection cover is a cover plate which is mounted to the back cover of the camera to close the air bleeding passage.

31. A waterproof and/or water-resistant camera according to claim 29, wherein said air connecting means comprises at least one air connecting groove formed in the cover plate.

32. A waterproof and/or water-resistant camera according to claim 29, wherein said air connecting means comprises at least one air connecting groove formed in the back cover of the camera.

33. A waterproof and/or water-resistant camera, comprising:
- a movable photographing lens barrel which moves in the optical axis direction of the camera;
- an air breathing passage for connecting the interior and the exterior of the camera;
- an air-impermeable and water-impermeable filter provided in the air breathing passage;
- a protection cover which covers the air-permeable and water-impermeable filter and constitutes an air connecting means for the air-permeable and water-impermeable filters; and
- said protection cover comprises a center connecting groove corresponding to the air-impermeable and water-impermeable filter, an inlet connecting groove connected to the center connecting groove, and an outlet connecting groove which is connected to the center connecting groove, so that when water which may enter the inlet connecting groove can be discharged from the outlet connecting groove through the center connecting groove.

34. A waterproof and/or water-resistant camera according to claim 33, wherein said inlet and outlet connecting grooves have a cross sectional area smaller than that of the center connecting groove.

35. A waterproof and/or water-resistant camera according to claim 33, wherein said inlet and outlet connecting grooves are opposed to each other on the opposite sides of the center connecting groove, so that water which may enter the inlet connecting groove can flow into the outlet connecting groove due to the gravity.

36. A waterproof and/or water-resistant camera, comprising:
- a camera body having a front wall;
- a movable photographing lens barrel which moves in the optical axis direction of the camera;
- an air breathing passage for connecting the interior and the exterior of the camera;
- an air-permeable and water-impermeable filter provided in the air breathing passage;
- a filter support formed on said front wall of said camera body; and
- a protection cover which covers the air-permeable and water-impermeable filter and constitutes an air connecting means for the air-permeable and water-impermeable filter.

37. A waterproof and/or water-resistant camera according to claim 36, wherein said air breathing passage comprises a plurality of separate air breathing holes.

38. A waterproof and/or water-resistant camera according to claim 37, wherein said filter support has a curved contour, so that the air-permeable and water-impermeable filter is provided on the curved filter support.

39. A waterproof and/or water-resistant camera according to claim 38, wherein said air breathing holes have a diameter of about 3~4 mm.

40. A waterproof and/or water-resistant camera according to claim 38, wherein said air-permeable and water-impermeable filter is of a curved-shape and has a large thickness enough to self-maintain the shape.

41. A waterproof and/or water-resistant camera according to claim 38, wherein said filter support comprises two arched bridging arms intersecting with each other, so that four air breathing holes are formed in quardrants defined by the bridging arms.

42. A waterproof and/or water-resistant camera, comprising:
- a movable photographing lens barrel which moves in the optical axis direction of the camera;
- an air breathing passage for connecting the interior and the exterior of the camera;
- an air-permeable and water-impermeable filter provided in the air breathing passage;
- a protection cover which covers the air-permeable and water-impermeable filter and constitutes an air connecting means for the air-permeable and water-impermeable filter; and
- a sound generator located to correspond to said air breathing passage.

43. A waterproof and/or water-resistant camera according to claim 42, further comprising a printed circuit board on which the sound generator is provided.

44. A waterproof and/or water-resistant camera according to claim 43, wherein said sound generator is a buzzer which warns a release time.

45. A waterproof and/or water-resistant camera according to claim 43, wherein said source generator is a buzzer which warns that no focusing can be effected.

* * * * *

UNITED STATES PATENT AND TRADEMARK OFFICE
CERTIFICATE OF CORRECTION

PATENT NO. : 5,070,348
DATED : December 3, 1991
INVENTOR(S) : M. HAYAKAWA et al.

It is certified that error appears in the above-indentified patent and that said Letters Patent is hereby corrected as shown below:

On the title page, item [56], "References Cited", line 9, change "Kano et al." to ---Kamo et al.---.
At column 13, line 45 (claim 19, line 2) insert ---.--- after "18".
At column 15, line 29 (claim 33, line 12) change "filters" to ---filter---.

Signed and Sealed this

Seventeenth Day of October, 1995

Attest:

BRUCE LEHMAN

Attesting Officer    Commissioner of Patents and Trademarks